(12) United States Patent
Arumugam et al.

(10) Patent No.: US 10,364,931 B1
(45) Date of Patent: Jul. 30, 2019

(54) COMPOSITION AND METHOD FOR PREPARING CORROSION RESISTANT MULTIFUNCTIONAL COATINGS

(71) Applicant: Oceanit Laboratories, Inc., Honolulu, HI (US)

(72) Inventors: Ganesh Kumar Arumugam, Honolulu, HI (US); Vinod Veedu, Houston, TX (US)

(73) Assignee: OCEANIT LABORATORIES, INC., Honolulu, HI (US)

(*) Notice: Subject to any disclaimer, the term of this patent is extended or adjusted under 35 U.S.C. 154(b) by 618 days.

(21) Appl. No.: 14/957,512

(22) Filed: Dec. 2, 2015

Related U.S. Application Data

(60) Provisional application No. 62/086,188, filed on Dec. 2, 2014.

(51) Int. Cl.
| | | |
|---|---|---|
| *F16L 58/08* | (2006.01) | |
| *B32B 15/01* | (2006.01) | |
| *B05D 5/08* | (2006.01) | |
| *C23C 18/32* | (2006.01) | |
| *C23C 18/16* | (2006.01) | |
| *C25D 5/34* | (2006.01) | |

(Continued)

(52) U.S. Cl.
CPC .............. *F16L 58/08* (2013.01); *B05D 5/083* (2013.01); *C23C 18/1637* (2013.01); *C23C 18/32* (2013.01); *C25D 3/562* (2013.01); *C25D 5/34* (2013.01); *C25D 5/48* (2013.01)

(58) Field of Classification Search
CPC . B32B 15/01; F16L 58/08; B05D 5/08; C23C 18/32

USPC .......................... 428/626; 205/149, 220, 223
See application file for complete search history.

(56) References Cited

U.S. PATENT DOCUMENTS

2003/0113577 A1* 6/2003 Zheng .................. B32B 15/013
428/673
2012/0264884 A1* 10/2012 Liu ....................... C08F 297/026
525/276

(Continued)

FOREIGN PATENT DOCUMENTS

CN       103408707    * 11/2013
CN       103408762    * 11/2013

OTHER PUBLICATIONS

Grujicic et al., "An overview of the polymer to metal direct adhesion hybrid technologies for load-bearing automotive components", 2008, J. Mat. Processing Tech., 197, pp. 363-373. (Year: 2008).*

(Continued)

*Primary Examiner* — Humera N Sheikh
*Assistant Examiner* — Xiaobei Wang
(74) *Attorney, Agent, or Firm* — Symbus Law Group, LLC; Clifford D. Hyra

(57) ABSTRACT

A multifunctional coating method involves cleaning a surface, applying a layer of corrosion-resistant alloy coating to the surface, and applying an oleo-hydrophobic composite coating over the corrosion-resistant alloy coating. An oil and gas pipe has an inner surface with a multifunctional coating applied using the multifunctional coating method, and has an inner oleo-hydrophobic composite coating, beneath the inner oleo-hydrophobic composite coating a corrosion-resistant alloy coating, and beneath the corrosion-resistant alloy coating untreated pipe or any other metallic substrate.

18 Claims, 4 Drawing Sheets

(51) Int. Cl.
*C25D 5/48* (2006.01)
*C25D 3/56* (2006.01)

(56) References Cited

U.S. PATENT DOCUMENTS

2013/0153432 A1* 6/2013 Jones .................... C25D 3/562
                                                    205/96
2016/0229875 A1* 8/2016 Qiu ....................... C07F 7/1836

OTHER PUBLICATIONS

Sigma-Aldrich, (3-Aminopropyl)triethoxysilane, https://www.sigmaaldrich.com/catalog/product/aldrich/440140?lang=en&region=US, accessed Oct. 18, 2018.*

Gelest, "Silane Coupling Agents", Version 2.0, accessed from <http://thenanoholdings.com/data/goodsImages/GOODS1_1273652420.pdf>, 2006, pp. 2-18. (Year: 2006).*

* cited by examiner

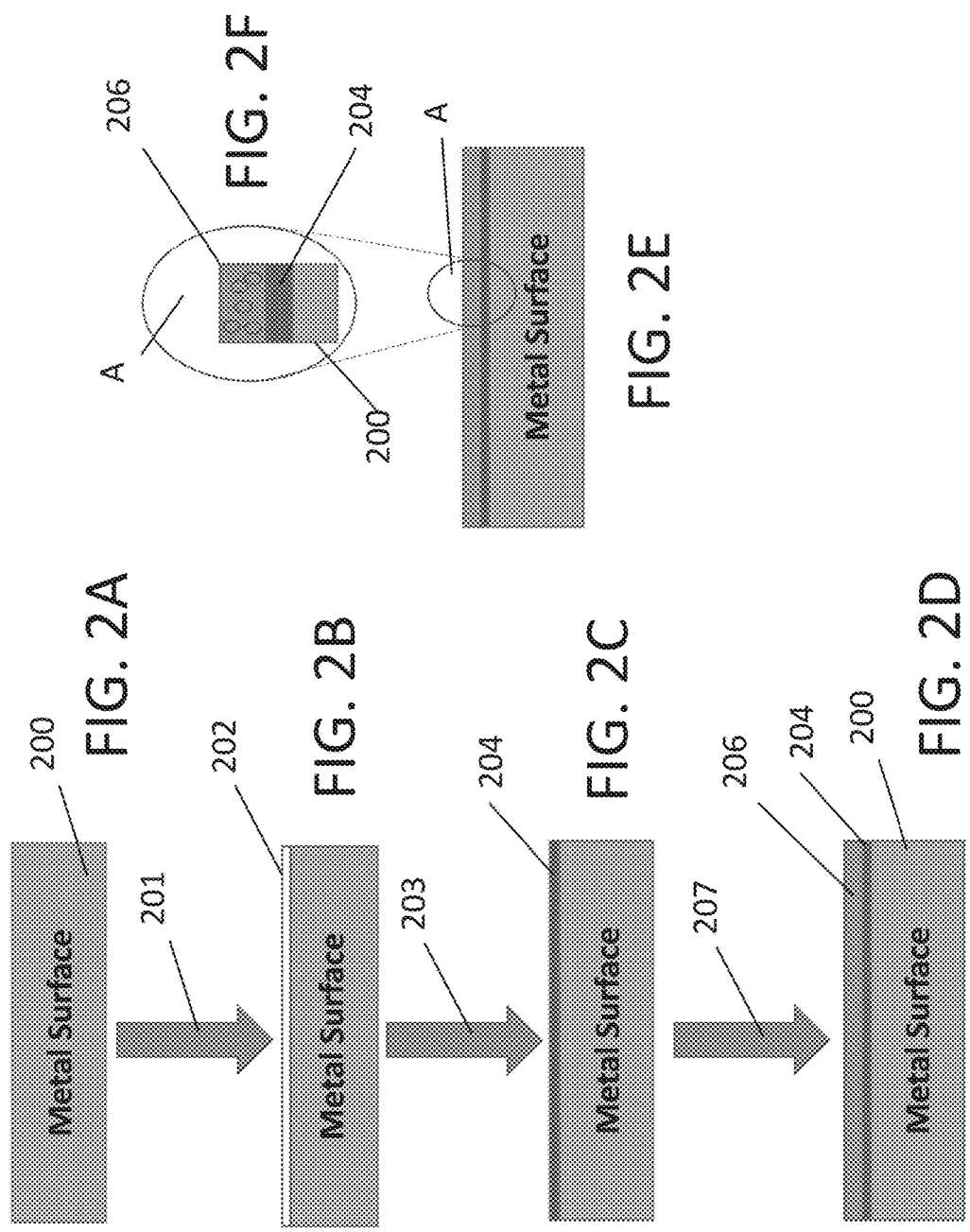

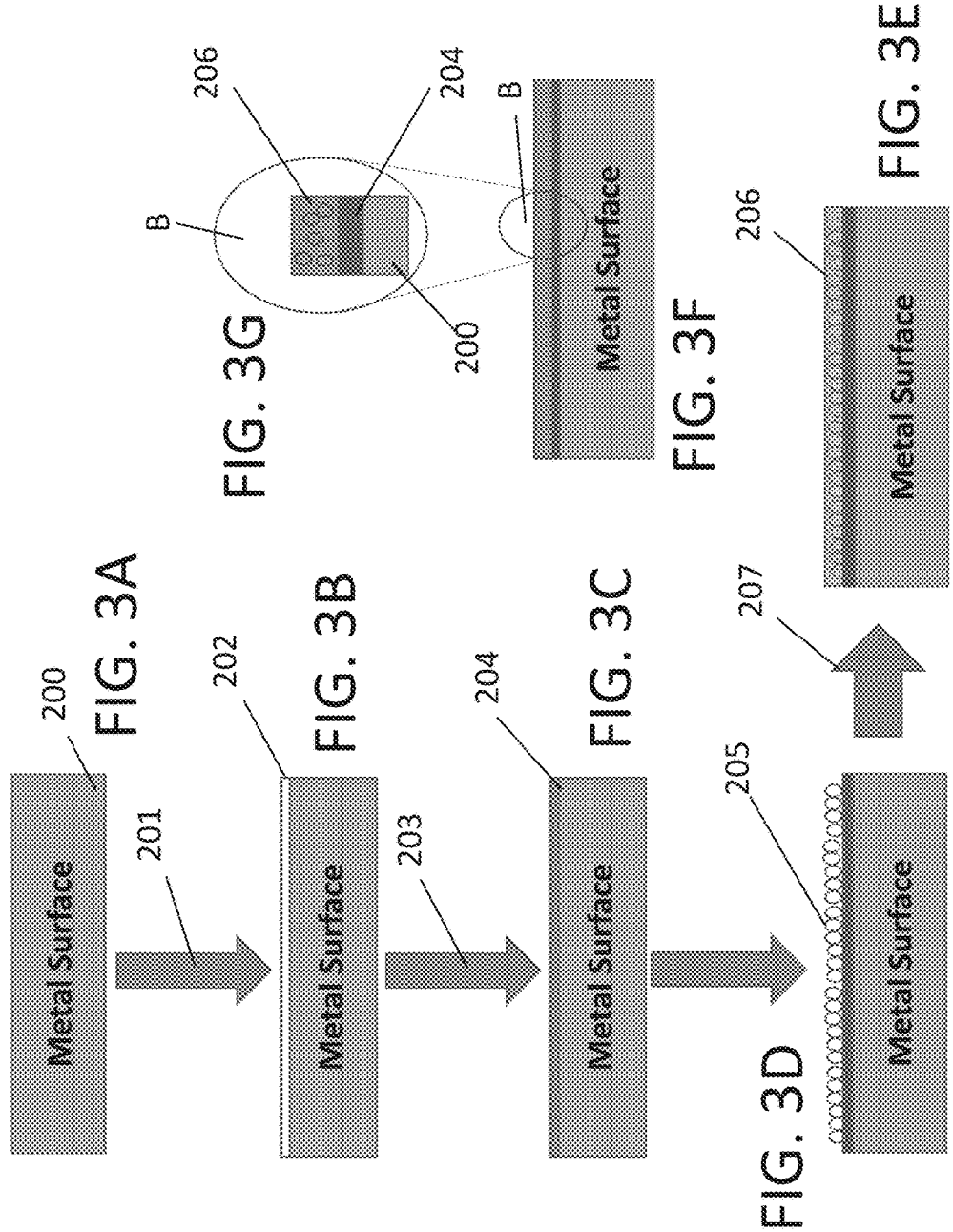

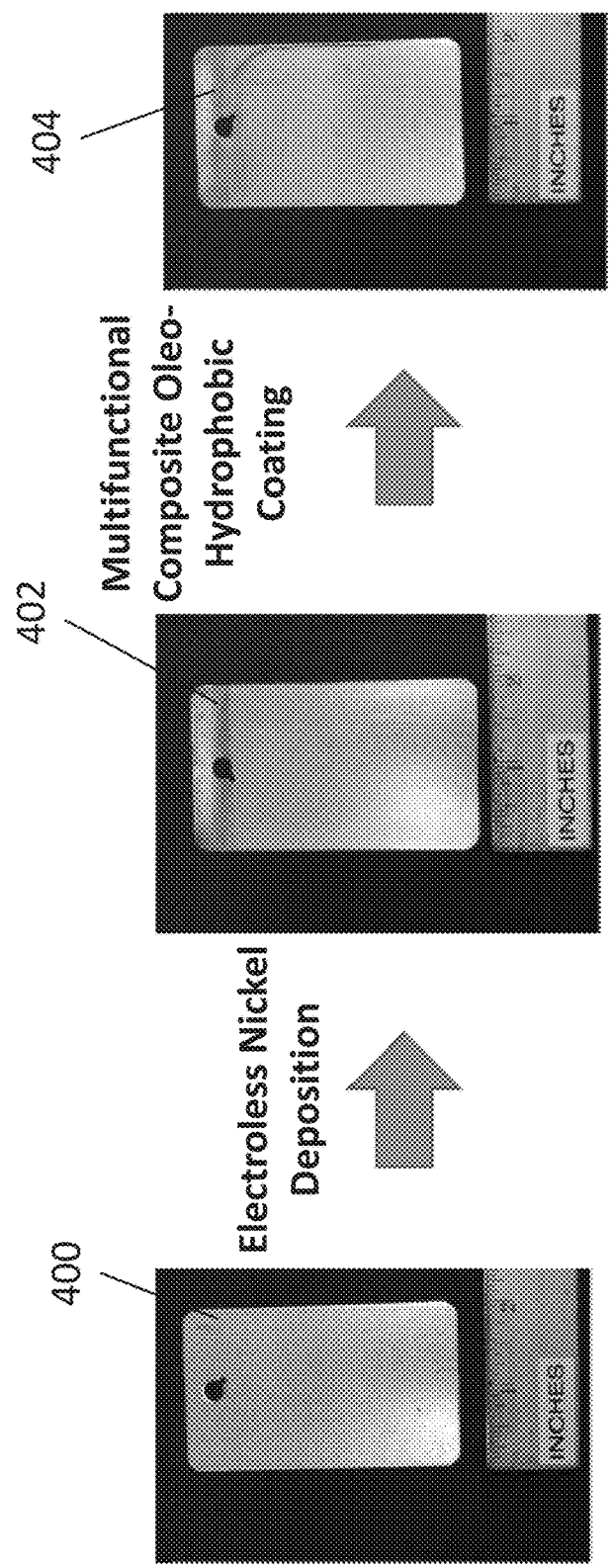

COMPOSITION AND METHOD FOR PREPARING CORROSION RESISTANT MULTIFUNCTIONAL COATINGS

This application claims the benefit of U.S. Provisional Application No. 62/086,188, filed Dec. 2, 2014, which is hereby incorporated by reference in its entirety.

FIELD OF THE INVENTION

The application relates generally to surface treatments and coatings to prevent scale build up and $H_2S$ and $CO_2$-induced corrosion and provide sweet gas and sour gas resistance and water/oil repellency.

BACKGROUND

There are not many commercial coatings available for corrosion resistance at high pressure and high temperature with multiphase flow in the presence of sweet and sour gas. Sour gas is any gas, but often natural gas, containing significant amounts of $H_2S$. Thus, such conditions are commonly encountered in oil and gas drilling and exploration operations. Deep sea and land oil and gas drilling typically involve pipeline temperatures of 200-250° C. and pressures above 100 psi and up to 20000 psi.

Corrosion resistant alloy coatings are difficult to apply on the interior of pipelines and in inaccessible areas and the process is not scalable. Existing corrosion resistant coating technology lacks $H_2S$ and $CO_2$ corrosion resistance. Most of the commercial solutions are based on a polymer or composite coating to prevent corrosion and $H_2S/CO_2$ attack but they provide minimal protection once the coating is damaged. The use of polymer-based coatings only provides a temporary resistance to these gases which is not maintained at high pressure and temperature.

Needs exist for improved corrosion-resistant surface treatments and coatings for use in the presence of sweet and sour gas and at high temperatures and pressures.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

A novel corrosion resistant coating can sustain corrosion-resistance in high temperature, high pressure, corrosive, sweet or sour gas environments. The high-water repellency also assists in improving scale resistance and other beneficial results. This coating may include a base metallic corrosion resistant layer containing nickel, chromium, cobalt and/or any other corrosion resistant alloys and a top layer of polymer composite coating capable of providing a low surface energy to reduce drag in multiphase flow regimes. The coating is useful for oil and gas drilling and exploration, as well as for marine, aviation, automobile, electronics, domestic, construction, and transportation applications, etc. Benefits of the new coating include durable corrosion resistance for metal surfaces, easy application on intricate components and hard-to-reach areas, especially in pipeline, pump, and valve interiors, improved $H_2S$ and $CO_2$ resistance, and durable performance at high pressure and high temperature.

In order to improve the protection of metal surfaces, a new multifunctional coating is used. The coating involves a thin layer of corrosion resistant alloy coating applied to the surface using, for example, electroless, brush plating or electroplating approaches, followed by application of a composite coating of nanoparticle-embedded perfluorinated polymer that is resistant to water/oil and impermeable/inert to sweet and sour gases. One good method of applying the corrosion resistant alloy coating is described in U.S. Ser. No. 13/740,914 to the same assignee, filed Jan. 14, 2012, which is hereby incorporated by reference in its entirety. The top coating is omniphobic and may consist of fluorinated nanoparticles (such as fluorinated silica nanoparticles) in a known commercial polymer. Functional groups (such as hydroxyl, epoxy, acrylic, amines etc) may be applied to the corrosion-resistant alloy before application of the top coating to improve durability.

Each layer has its own function—the inner, first alloy coating prevents sour gas attack, while the top composite layer functions as an oil and water repellant. The top layer can break down at high temperatures and pressures, leaving the surface below it exposed to the environment, including oil, water, and/or gas. Steel, commonly used for oil and gas pipelines and other applications, is extremely prone to sour gas corrosion, and if exposed directly experiences immediate corrosion. However, the corrosion resistant alloy coating beneath the composite layer prevents this from occurring. The multifunctional coating provides simple, scalable dual layer surface protection of $H_2S$ resistance and water and oil repellency.

In some alternative embodiments and certain applications, the corrosion resistant alloy layer may be used alone with sufficient strength to provide substantial corrosion protection.

A new multifunctional coating method includes the steps of cleaning a surface, applying a layer of corrosion-resistant alloy coating to the surface, and applying an oleo-hydrophobic composite coating over the corrosion-resistant alloy coating. The method may also include modifying and functionalizing the layer of corrosion-resistant alloy coating by chemical and/or electrochemical etching and attachment of functional groups, prior to application of the oleo-hydrophobic composite coating. The surface cleaning may include shot blasting and/or acid/base washing. The corrosion-resistant alloy may be applied by at least one of electroless plating, brush plating, and electroplating. The oleo-hydrpohobic composite coating may include corrosion-resistant nanoparticles embedded in perfluorinated polymer.

A new or existing oil and gas pipe has an inner surface with a multifunctional coating applied to the inside surface, which includes an inner oleo-hydrophobic composite coating, beneath the inner oleo-hydrophobic composite coating a corrosion-resistant alloy coating, and beneath the corrosion-resistant alloy coating untreated pipe material.

Multifunctional corrosion resistant coatings can also be applied to metallic surfaces (e.g. aluminum, copper, and/or chromium-based alloys) other than steel or stainless steel alloys.

BRIEF DESCRIPTION OF THE DRAWINGS

The accompanying drawings, which are incorporated herein and form a part of the specification, illustrate exemplary embodiments and, together with the description, fur

FIGS. 2A-2E are schematics illustrating the changes occurring on a metal surface during a corrosion resistant multifunctional coating process, in an embodiment.

FIG. 2F is a detail view of area A of FIG. 2E.

FIG. 3A-F are schematics illustrating the changes occurring on a metal surface during a corrosion resistant multifunctional coating process, in another embodiment.

FIG. 3G is a detail view of area B of FIG. 3F.

FIG. 4A-C are a series of images showing a steel sample undergoing a corrosion resistant multifunctional coating process, in an embodiment.

DETAILED DESCRIPTION

Figure 1:
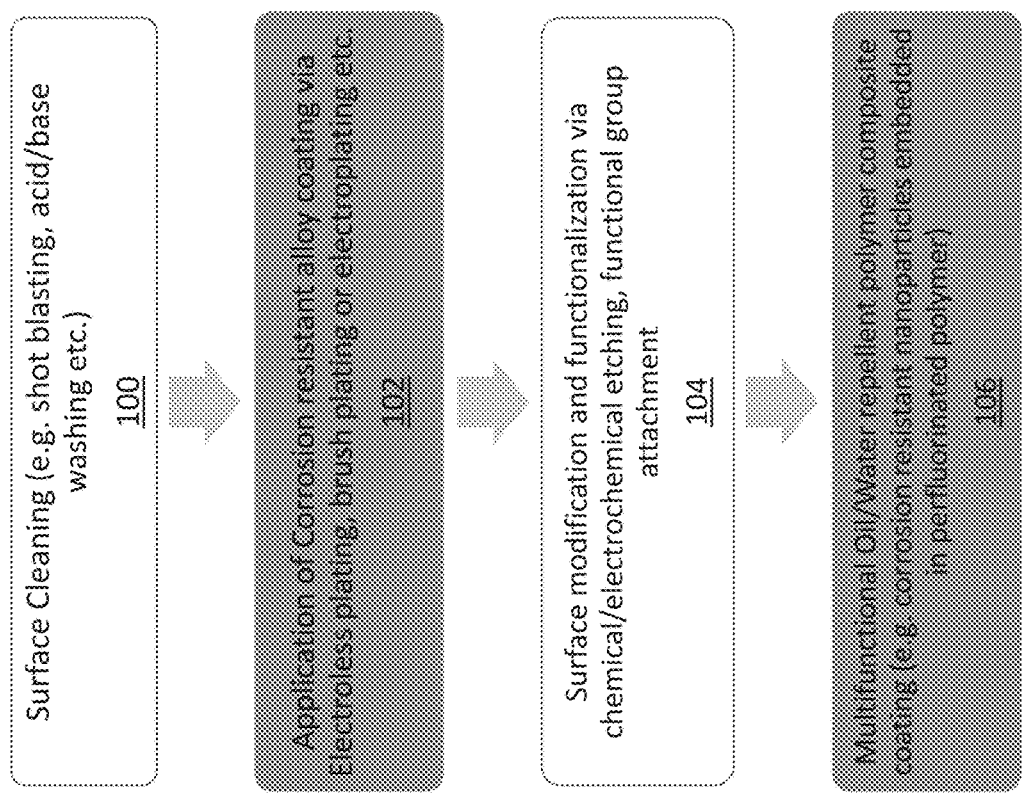
- FIG. 1 is a flowchart of a corrosion resistant multifunctional coating process, in an embodiment.

A composition and method for preparing corrosion resistant multifunctional coatings on ferrous and non-ferrous alloys for high pressure/high temperature applications will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The figures are not to scale. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a flowchart of a corrosion resistant multifunctional coating process, in an embodiment. First, the surface to be coated is cleaned 100, for example by shot blasting, acid/base washing, and/or other known techniques. Next, a corrosion-resistant alloy coating is applied 102, for example using a technique such as electroless plating, brush plating, electroplating, etc. Then, the surface of the corrosion-resistant alloy coating is modified and functionalized 104 using chemical and/or electrochemical etching and functional group attachment. Finally, a multifunctional oil/water repellant polymer composite coating is applied 106, for example corrosion-resistant nanoparticles embedded in perfluorinated polymer.

FIGS. 2A-F are schematics illustrating the changes occurring on a metal surface 200 during a corrosion resistant multifunctional coating process, in an embodiment. Starting with a metal surface 200 as shown I FIG. 2A, first that surface is cleaned 201, leaving a clean top surface 202 of the metal as shown in FIG. 2B for application of the coating. Next the corrosion resistant alloy is deposited 203 onto the clean top surface, resulting in a metal surface having a top layer of corrosion-resistant alloy 204 as shown in FIG. 2C. A multifunctional composite oleo-hydrophobic coating 206 is applied 207 to the corrosion-resistant alloy layer, forming the final top layer on the surface as shown in FIG. 2D. The final surface comprises a bottom layer of unchanged metal 200, a middle layer of corrosion-resistant alloy coating 204, and a top layer of multifunctional composite oleo-hydrophobic coating 206 as shown in FIG. 2E and detail FIG. 2F.

FIGS. 3A-G are schematics illustrating the changes occurring on a metal surface 200 during a corrosion resistant multifunctional coating process, in an embodiment. This schematic is similar to FIGS. 2A-F, but with the addition of a functional group attachment step shown in FIG. 3D, in which functional groups 205 are attached to the corrosion-resistant alloy as a nanoparticle coating prior to application of the multifunctional composite oleo-hydrophobic coating 206 as shown in FIG. 3E for enhanced adhesion and durability.

FIGS. 4A-C are a series of images showing a steel sample undergoing a corrosion resistant multifunctional coating process, in an embodiment. First FIG. 4A shows a bare steel sample 400 two inches in width. Next, FIG. 4B shows the steel after an electroless nickel deposition has been performed on it, giving it a top layer of corrosion-resistant nickel alloy 402. Finally, FIG. 4C shows the steel sample with a top layer of corrosion-resistant composite coating 404 after a multifunctional composite oleo-hydrophobic coating has been applied.

These and other objectives and features of the invention are apparent in the disclosure, which includes the above and ongoing written specification.

The invention is not limited to the particular embodiments described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the scope of the invention.

We claim:

1. A multifunctional coating method, comprising:
cleaning a surface;
applying a layer of corrosion-resistant alloy coating to the surface by at least one of electroless plating, brush plating, and electroplating;
modifying and functionalizing the layer of corrosion-resistant alloy coating by chemical and/or electrochemical etching and attachment of hydroxyl, epoxy, acrylic, or amines functional groups, prior to application of an oleo-hydrophobic composite coating; and,
applying the oleo-hydrophobic composite coating over the corrosion-resistant alloy coating; wherein the oleo-hydrophobic composite coating comprises metallic nanoparticles embedded in a coating matrix.

2. The method of claim 1, wherein the surface cleaning comprises shot blasting and/or acid/base washing.

3. The method of claim 1, wherein the corrosion-resistant alloy comprises at least one of nickel, nickel-phosphorous, nickel-cobalt, nickel-boron, nickel-PTFE, and chromium.

4. The method of claim 1, wherein the oleo-hydrophobic composite coating comprises corrosion-resistant nanoparticles embedded in perfluorinated and/or fluorinated polymer.

5. The method of claim 1, wherein the oleo-hydrophobic composite coating further comprises ceramic nanoparticles embedded in the coating matrix.

6. The method of claim 1, wherein the metallic nanoparticles comprise at least one of nickel, copper, and iron nanoparticles.

7. The method of claim 5, wherein the ceramic nanoparticles comprise at least one of silica, alumina, titania, and ceria nanoparticles.

8. The method of claim 5, further comprising functionalizing the embedded nanoparticles by attaching at least one of perfluoro octyl trichloro silane, perfluoro octyl phosphonic acid, perfluoro polyhedral oligomeric silsesquioxanes (POSS), trichloro octa decyl, trichlor octyl silane, perfluorosiloxane, fluorohydrocarbon, fluorinated silane, fluorinated acid, amine, phosphoric acid, alcohol, acrylates, epoxy, ester, ethers, sulfonate, and/or fluorinated or non-fluorinated monomers.

9. The method of claim 1, wherein the oleo-hydrophobic composite coating comprises perfluorinated polymers.

10. The method of claim 9, wherein the perfluorinated polymers comprise perfluoro poly ether monomers.

11. The method of claim 10, wherein the perfluoro poly ether monomers comprise at least one of perfluoro poly ether acrylates, perfluoro poly ether epoxy, and perfluoro poly ether-urethane.

12. The method of claim 9, wherein the perfluorinated polymers comprise perfluorosilane terminated polymers and/or monomers, and/or fluorinated polymers and/or monomers.

13. The method of claim 12, wherein the perfluorinated polymers comprise fluorinated polymers, comprising acrylic, epoxy, urethanes, silicones and/or siloxanes.

14. A layered surface made with a multifunctional coating applied according to the method of claim 1, comprising the oleo-hydrophobic composite coating, the corrosion-resistant alloy coating, and untreated material, wherein the corrosion-resistant alloy coating is provided between the untreated material and the oleo-hydrophobic composite coating.

15. The layered surface of claim 14, wherein the layered surface is an inner surface of a pipe, and wherein the untreated material is untreated pipe material.

16. The layered surface of claim 14, wherein the untreated material comprises an iron-based alloy.

17. The layered surface of claim 14, wherein the untreated material comprises a non-pipe, non-tubular metallic material.

18. The method of claim 5, wherein the embedded nanoparticles are functionalized by attaching at least one of perfluoro octyl trichloro silane, perfluoro octyl phosphonic acid, perfluoro polyhedral oligomeric silsesquioxanes (POSS), trichloro octa decyl, trichlor octyl silane, perfluorosiloxane, fluorohydrocarbon, fluorinated silane, fluorinated acid, amine, phosphoric acid, alcohol, acrylates, epoxy, ester, ethers, sulfonate, and/or non-fluorinated monomers.

* * * * *